United States Patent

Ahrons

[15] 3,676,711

[45] July 11, 1972

[54] DELAY LINE USING INTEGRATED MOS CIRCUITRY

[72] Inventor: Richard Wilfred Ahrons, Somerville, N.J.

[73] Assignee: RCA Corporation

[22] Filed: Feb. 19, 1970

[21] Appl. No.: 12,613

[30] Foreign Application Priority Data

Nov. 17, 1969 Great Britain ......................56,222/69

[52] U.S. Cl. ..........................307/293, 307/221 C, 307/238, 307/251, 307/255, 307/279, 307/304, 307/313

[51] Int. Cl. ..........................H03k 17/28

[58] Field of Search ..............307/205, 238, 251, 221 C, 279, 307/313, 304, 255, 293, 221; 330/35; 328/55

[56] References Cited

UNITED STATES PATENTS

| | | | |
|---|---|---|---|
| 3,395,292 | 7/1968 | Bogert | 307/279 X |
| 3,406,346 | 10/1968 | Wanlass | 307/304 X |
| 3,431,433 | 3/1969 | Ball et al. | 307/221 C |
| 3,457,435 | 7/1969 | Burns et al. | 307/205 X |
| 3,483,400 | 12/1969 | Washizuka et al. | 307/251 X |
| 3,500,062 | 3/1970 | Annis | 307/205 X |
| 3,513,329 | 5/1970 | Washizuka et al. | 307/279 |
| 3,524,077 | 8/1970 | Kaufman | 307/221 C X |
| 3,526,783 | 9/1970 | Booher | 307/205 |
| 3,289,010 | 11/1966 | Bacon et al. | 307/221 |
| 3,172,043 | 3/1965 | Altman | 328/55 |

OTHER PUBLICATIONS

Sidorsky, MTOS Shift Registers, General Instrument Corporation Application Notes, December 1967, pp. 1–3.

Lohman, Applications of MOS Fet's in Microelectronics, SCP and Solid State Technology, March 1966, pp. 23–29.

*Primary Examiner*—Stanley T. Krawczewicz

*Attorney*—Eugene M. Whitacre and William H. Meagher

[57] ABSTRACT

"Bucket brigade" type of delay line is realized in integrated circuit form with MOS devices serving all switching, storage, amplifier and amplifier load functions. Configurations wherein devices are all of the same channel conductivity type are disclosed, as well as configurations employing complementary devices. Certain embodiments utilize a pair of complementary switching waveforms for interleaved switching operations, while in other embodiments a single switching waveform suffices. Modifications for minimizing coupling of the switching signal into the delayed signal are also shown.

10 Claims, 6 Drawing Figures

INVENTOR.
Richard W. Ahrons
BY William H. Meagher
ATTORNEY

INVENTOR.
Richard W. Ahrons
BY William H. Meagher
ATTORNEY

DELAY LINE USING INTEGRATED MOS CIRCUITRY

The present invention relates to analog signal delay apparatus of the so-called "bucket brigade" type, and particularly to such apparatus employing MOS transistor circuit configurations conveniently realizable in monolithic integrated circuit form.

General principles of the "bucket brigade" type of delay line are disclosed, for example, in an article by W. J. Hannan, et al., entitled "Automatic Correction of Timing Errors in Magnetic Tape Recorders", appearing in the July-October 1965 issue of the I.E.E.E. Transactions of Military Electronics. Simply described, the delay line comprises cascaded units, each consisting of a sampling switch, a holding capacitor and an amplifier, with alternate switches closing when the intermediate switches open, and vice versa. Input signal samples are passed along the line, effectively "dumped" from one capacitor into the next as in a "bucket bridgade." The resultant arrangement may also be viewed (borrowing from digital circuit terminology) as a shift register for analog signals.

Pursuant to the principles of the present invention, an advantageous form of "bucket brigade" delay line is obtained with MOS field effect transistors serving all switching, storage and amplifier functions. The resultant circuitry, which may consist solely of MOS transistors and interconnecting conductors, is of particular advantage in that it is readily realizable in monolithic integrated circuit form.

The total delay imparted by the "bucket brigade" is dependent only upon the number of delay stages connected in cascade and the sampling or switching frequency. With known MOS integration techniques permitting iteration of a large number of MOS transistor stages upon an IC chip of diminutive dimensions, use of the present invention enables avoidance of the bulkiness associated with more conventional analog delay devices such as the ultrasonic delay line.

In accordance with an illustrative embodiment of the present invention, each half-stage of the delay line employs, for example, a P-channel enhancement mode MOS transistor as a sampling switch, with a switching waveform applied to its gate electrode, and with its source-drain path serially disposed between an input terminal and the input of an amplifier. A second P-channel enhancement mode MOS transistor serves as the active device of the amplifier, while a third P-channel enhancement mode MOS transistor (with its gate electrode tied to its drain electrode) serves as a load in the drain circuit of the second transistor. The input capacitance presented at the insulated gate of the second transistor serves as the holding capacitor.

The gate electrodes of the switch transistors in successive half-stages of the illustrative embodiment above described are driven by respective complementary switching waveforms so that one switch is open when the other is closed, and vice versa. In accordance with other embodiments of the present invention, the alternate switching effect may be achieved using one common switching waveform, by use of MOS transistors of differing channel conductivity type in successive half-stages.

Pursuant to additional features of the present invention, the switching portions of each stage may be modified to preclude capacity coupling of the switching signal into the delayed signal path.

A primary object of the present invention is to provide novel and improved signal delay apparatus of the "bucket brigade" type in a circuit configuration facilitating realization on a monolithic integrated circuit chip.

Other objects and advantages of the present invention will be readily recognized by those skilled in the art upon a reading of the following detailed description and an inspection of the accompanying drawing in which.

Figure 1:
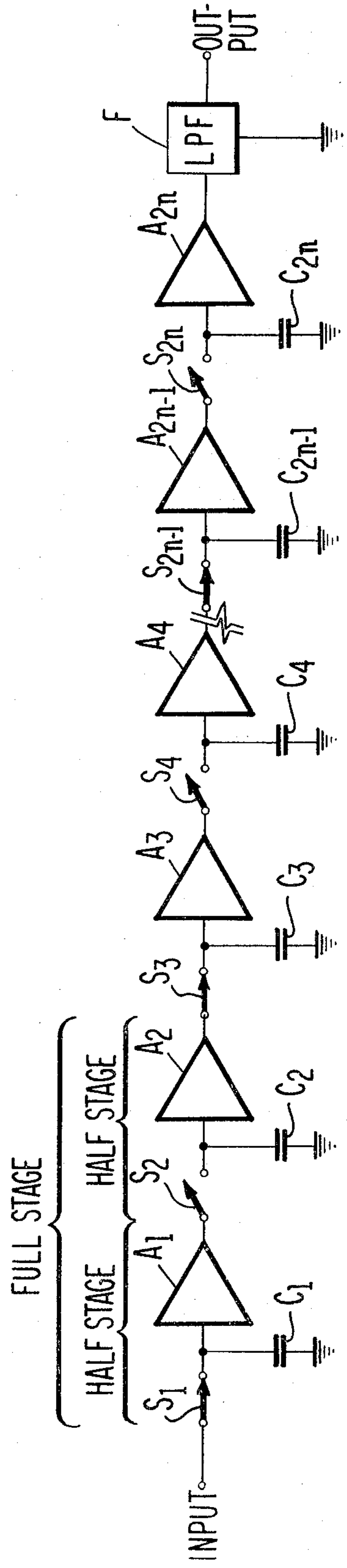
FIG. 1 illustrates diagrammatically a simplified model of a "bucket brigade" delay line.

FIG. 1 shows a simplified model for an analog shift register or "bucket brigade" type delay line. Each stage of the delay line consists of two half-stages, and each half-stage is composed of a sampling switch, a holding capacitor and an amplifier. The voltage amplifiers are assumed to have infinite input impedance and unity gain (either negative or positive). The switches are electrically controlled and operate so that all odd-numbered switches (i.e., $S_1$, $S_3$, $S_5$, . . . ) are closed when all even-numbered switches (i.e., $S_2$, $S_4$, $S_6$, . . . ) are opened, and vice versa.

Information is introduced into the first half-stage by means of switch $S_1$. When $S_1$ opens, a sample of the information is held by capacitor $C_1$. The stored information appears at the output of amplifier $A_1$ and is introduced into the second half-stage by means of switch $S_2$, which is closed when $S_1$ is open. When switch $S_2$ opens, the information is stored on capacitor $C_2$ and appears at the output of amplifier $A_2$. The original input information is thus delayed over a period determined by the sequential closing and opening of switches $S_1$ and $S_2$. Larger delays are produced by use of more than one stage, as shown. The information proceeds from stage to stage in a manner analogous to a "bucket brigade" of capacitors.

The total delay depends on the number of stages used and the frequency at which the switches operate; i.e., $T_D = n/f_s$, where $T_D$ is the total delay, $n$ is the total number of stages, and $f_s$ is the sampling frequency. It is important to realize that the delayed signal is a sampled signal. It is necessary, therefore, that a sufficient number of samples be obtained to reconstruct the original but delayed signal. The sampling theorem states that a band-limited signal of maximum frequency $f_m$ can be reconstructed if the sampling rate $f_s$ is at least twice the maximum frequency of the signal; i.e., $f_s > 2f_m$.

Because the delay time of the FIG. 1 delay arrangement is not affected by physical characteristics of the devices, maintenance of correct delay time as a function of temperature, aging, etc., is not a problem. The only requirement for a stable and accurate delay time is a stable and accurate sampling frequency. If a variable delay is desired, this may be simply effected by varying the sampling frequency.

Figure 2:
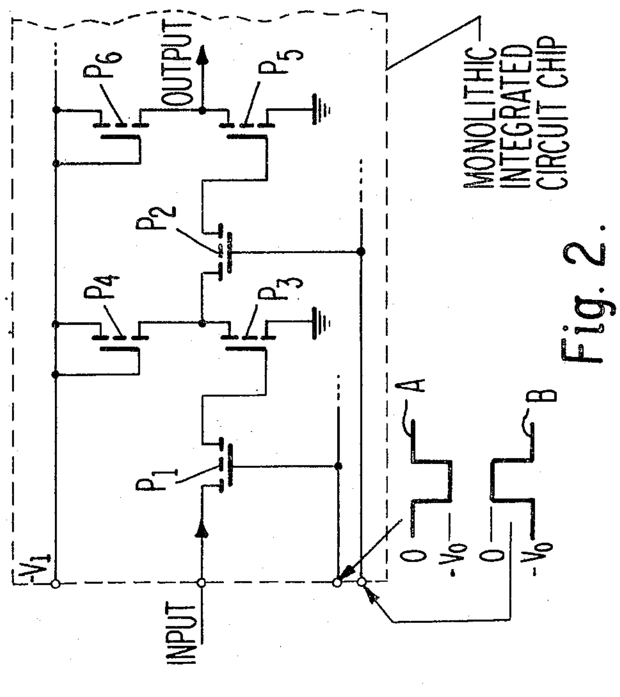
FIG. 2 illustrates schematically a monolithic integrated circuit chip employing MOS transistor circuitry in accordance with an embodiment of the present invention for the stages of the FIG. 1 delay line.

An advantageous circuit form for monolithic integrated circuit realization of each FIG. 1 stage in accordance with the present invention is shown in FIG. 2. This is an all P-channel MOS field effect transistor circuit disposed on a common substrate. MOS transistors $P_1$ and $P_2$ act in place of the switches, $S_1$ and $S_2$, of FIG. 1, and are controlled at their respective gates. $P_3$ and $P_4$ form an MOS/MOS-load amplifier, serving as the amplifier $A_1$ of FIG. 1. $P_5$ and $P_6$ form a similar amplifier to provide the function of the amplifier $A_2$ of FIG. 1. The input capacitances at the gates of transistors $P_3$ and $P_5$, respectively, function as the capacitors $C_1$ and $C_2$ of FIG. 1. The gain of $-1$ for the amplifiers is effectively achieved by making the geometrical size of $P_3$ equal to that of $P_4$, and that of $P_5$ equal to that of $P_6$. The design gives an output D.C. voltage equal to the input D.C. voltage at each amplifier stage.

The switching or transfer signal is shown in a first form in FIG. 2 with the "A" signal (controlling $P_1$, and succeeding odd-numbered switches) a phase-inverted version of the "B" signal (controlling $P_2$, and succeeding even-numbered switches), so that $P_1$ and $P_2$ are in opposite states, i.e., on or off. An alternative form is a pulse form, where the A pulses fall in between the B pulses. The latter case degenerates to the former when the pulses are widened to their limits set by not permitting overlap. In addition, one could even use sine waves to operate as the transfer signal.

Figure 3:
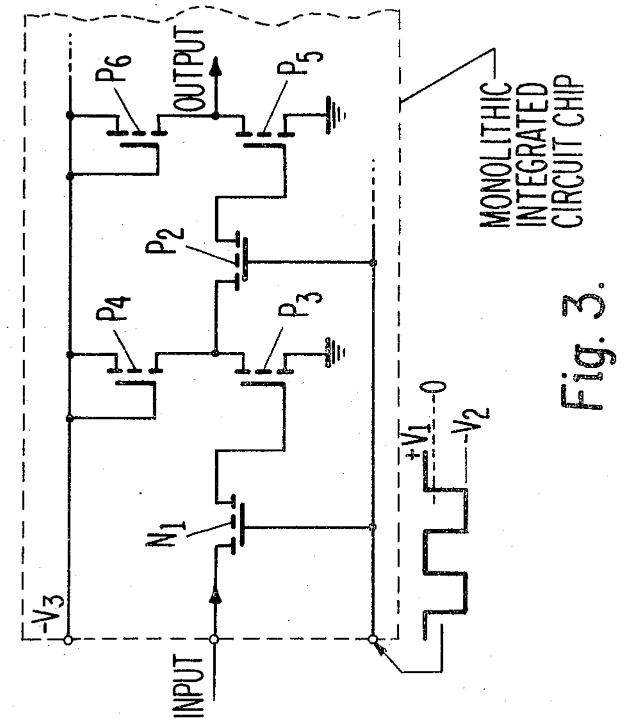
FIGS. 3–6 illustrate modifications of the FIG. 2 structure in accordance with further embodiments of the present invention.

FIG. 3 shows a modified form of the FIG. 2 circuit, with $P_1$ now changed to $N_1$, an N-channel MOS transistor. This allows the successive switch gates to be connected together, and only one transfer signal "S" is required.

Figure 4:
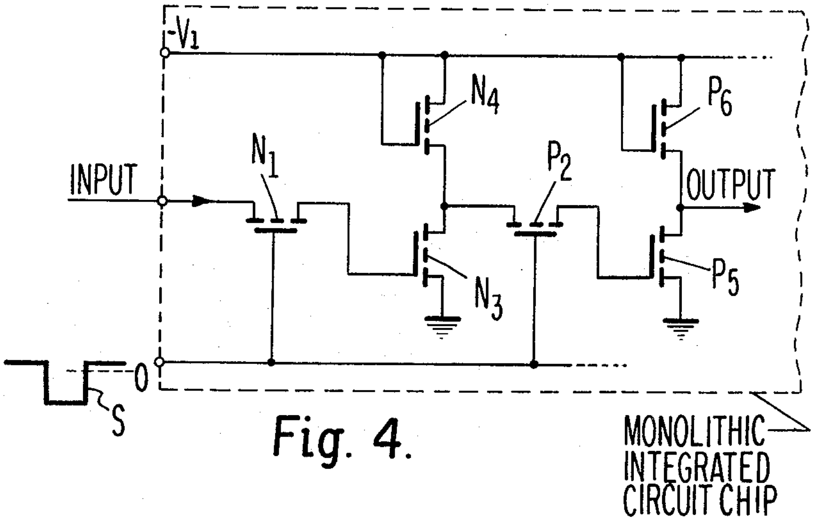

FIG. 4 shows a modification of the FIG. 3 circuit where $N_3$ and $N_4$ form an MOS/MOS-load amplifier of N-channel MOS type, responding to switch $N_1$. In this circuit arrangement, each stage incorporates three N-channel devices and three P-channel devices, giving an equal amount of each type.

In the circuits of FIGS. 2 to 4 each switch is constituted by a single MOS transistor. In these circuits, undesirably, the transfer signal can be capacity coupled into the path of the delayed signal (as by the capacitance from gate of $P_1$ to gate of $P_3$, for example, which is equivalent to the gate-to-drain capacitance of the $P_1$ MOS transistor). This transfer signal can be electronically filtered from the delayed signal, but will add to the requirements of relative attenuation of pass band to stop band of the output filter (low pass filter F, FIG. 1).

Figure 5:
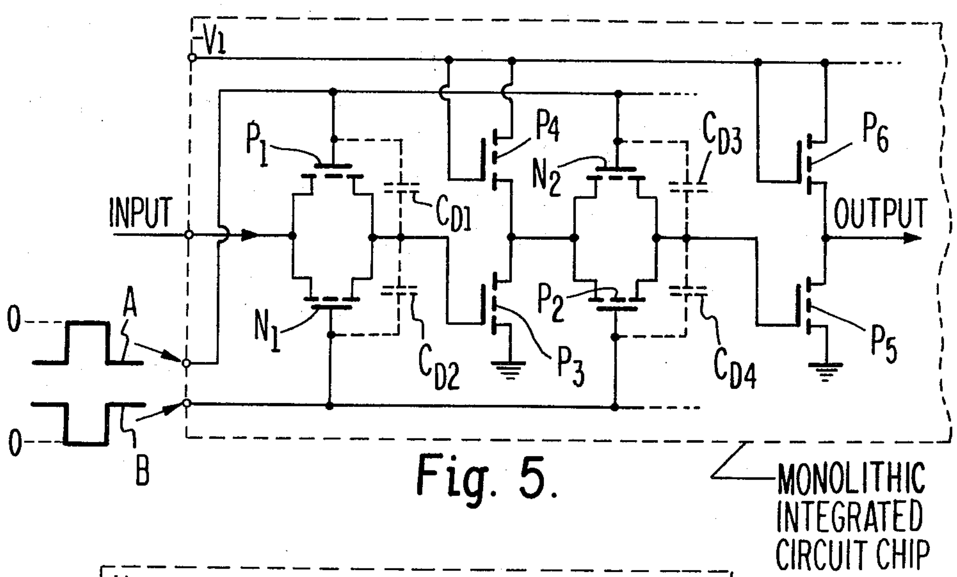

FIG. 5 illustrates a modification of the FIG. 2 circuit, which alleviates the transfer signal coupling problem. Here, each switch includes a P-channel MOS transistor and an N-channel MOS transistor (with source-drain paths directly in shunt with each other), with $P_1$ and $N_2$ gates receiving switching waveform A, and $N_1$ and $P_2$ gates receiving the inverted waveform B. By equalizing the gate-drain capacitances for each pair (i.e., by designing for $C_{D1} = C_{D2}$ and $C_{D3} = C_{D4}$), the opposing-phase, capacity-coupled transfer signals at each amplifier input tend to cancel out, so that little or no coupling of the transfer signal into the delayed signal results.

Figure 6:
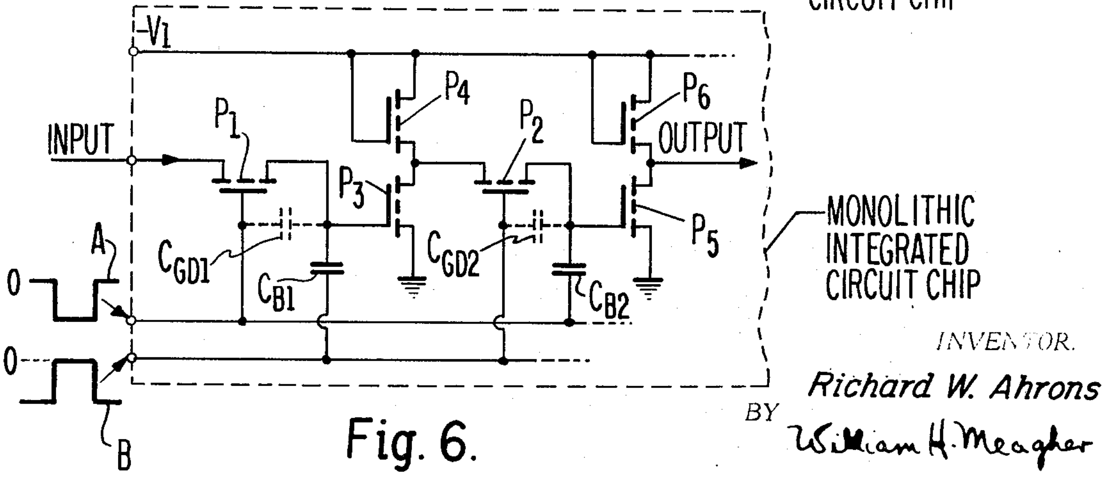

An alternative method of alleviating the transfer signal coupling problem is illustrated in FIG. 6, which represents a modification of the all P-channel transistor circuit of FIG. 2. Added to the FIG. 2 circuit configuration in FIG. 6 is a capacitor $C_{B1}$, which couples the transfer signal waveform B to the drain electrode of the first switch transistor $P_1$. Also added is a capacitor $C_{B2}$, which couples the transfer signal waveform A to the drain electrode of the second switch transistor $P_2$. By proportioning the capacitive value of the added capacitors to equal the gate-to-drain capacitances of the switching transistors (i.e., by making $C_{B1} = C_{GD1}$ and $C_{B2} = C_{GD2}$), the undesired transfer signal coupling may be balanced out.

What is claimed is:

1. Analog signal delay apparatus of the "bucket brigade" type comprising, in combination:

a plurality of delay stages in cascade, each of said delay stages including:

a. a delay stage input terminal;

b. a delay stage output terminal;

c. a first MOS transistor amplifier of substantially unity gain having an input electrode at which storage capacitance is exhibited, a common electrode and an output electrode;

d. a first MOS switching transistor having gate, source and drain electrodes, the source-drain path of said first MOS switching transistor being disposed serially between said delay stage input terminal and said input electrode of said first MOS transistor amplifier, said first switching transistor providing, when rendered conducting, a low impedance conductive path between said delay stage input terminal and said input electrode of said first transistor amplifier for altering the charge on said storage capacitance to establish a voltage level thereat substantially corresponding to the signal level at said delay stage input terminal at the time of conduction of said first switching transistor;

e. a second MOS transistor amplifier of substantially unity gain having an input electrode at which storage capacitance is exhibited, a common electrode and an output electrode;

f. a second MOS switching transistor having gate, source and drain electrodes, the source-drain path of said second MOS switching transistor being disposed serially between the output electrode of said first MOS transistor amplifier and the input electrode of said second MOS transistor amplifier, said second switching transistor providing, when rendered conducting, a low impedance conductive path between said output electrode of said first transistor amplifier and the input electrode of said second transistor amplifier for altering the charge on said last-named storage capacitance to establish a voltage level thereat substantially corresponding to the signal level at said output electrode of said first transistor amplifier at the time of conduction of said second switching transistor;

g. means coupling said output electrode of said second MOS transistor amplifier to said delay stage output terminal; and h. means coupled to the gate electrodes of said first and second MOS switching transistors for alternately rendering said first and second switching transistors conducting so that a signal level appears at said delay stage output terminal at a time of conduction of said second switching transistor substantially corresponding in level to the signal level appearing at said delay stage input terminal during the immediately preceding time of conduction of said first switching transistor, and such signal level appearance at said delay stage output terminal persists during the immediately succeeding time of conduction of said first switching transistor.

2. Apparatus in accordance with claim 1 wherein said first and second switching transistors are of opposite channel conductivity type, and said means for alternately rendering said switching transistors conducting includes means for applying coinciding phases of a switching waveform to the respective gate electrodes of said first and second switching transistors.

3. Apparatus in accordance with claim 1 wherein said first and second switching transistors are of the same channel conductivity type, and said means for alternately rendering said switching transistors conducting includes means for applying mutually opposing phases of a switching waveform to the respective gate electrodes of said first and second switching transistors.

4. Apparatus in accordance with claim 3 also including third and fourth switching transistors, each having gate, source and drain electrodes but differing in channel conductivity type from said first and second switching transistors, wherein said third switching transistor has its source-drain path shunted across the source-drain path of said first switching transistor and its gate electrode connected to the gate electrode of said second switching transistor, and wherein said fourth switching transistor has its source-drain path shunted across the source-drain path of said second switching transistor and its gate electrode connected to the gate electrode of said first switching transistor.

5. Delay apparatus of the "bucket brigade" type comprising, in combination;

a plurality of delay stages in cascade, each of said delay stages including:

a. a delay stage input terminal;

b. a delay stage output terminal;

c. a first MOS transistor amplifier having an input electrode at which storage capacitance is exhibited, a common electrode and an output electrode;

d. a first MOS switching transistor having gate, source and drain electrodes, the source-drain path of said first MOS switching transistor being disposed serially between said delay stage input terminal and said input electrode of said first MOS transistor amplifier;

e. a second MOS transistor amplifier having an input electrode at which storage capacitance is exhibited, a common electrode and an output electrode;

f. a second MOS switching transistor having gate, source and drain electrodes, the source-drain path of said second MOS switching transistor being disposed serially between the output electrode of said first MOS transistor amplifier and the input electrode of said second MOS transistor amplifier;

g. means coupling said output electrode of said second MOS transistor amplifier to said delay stage output terminal;

h. means coupled to the gate electrodes of said first and second MOS switching transistors for alternately rendering said first and second switching transistors conducting; and i. a first capacitor coupled between the gate electrode of said second switching transistor and the input electrode of said first transistor amplifier, and a second capacitor coupled between the gate electrode of said first switching transistor and the input electrode of said second transistor amplifier; and wherein said first and second switching transistors are of the same channel conductivity type, and said means for alternately rendering said switching transistors conducting includes means for applying mutually opposing phases of a switching waveform to the respective gate electrodes of said first and second switching transistors.

6. Apparatus in accordance with claim 5 wherein said first and second capacitors substantially correspond in capacitance value to the respective gate-to-drain capacitances exhibited by said first and second switching transistors.

7. An integrated circuit analog signal delay line comprising, in combination on a common substrate,:

a plurality of delay stages in cascade, each of said delay stages including:

a. a delay stage input terminal;

b. a delay stage output terminal;

c. a first MOS transistor amplifier having substantially unity gain and having an input electrode at which storage capacitance is exhibited, a common electrode and an output electrode;

d. a first MOS switching transistor having gate, source and drain electrodes, the source-drain path of said first MOS switching transistor being disposed serially between said delay stage input terminal and said input electrode of said first MOS transistor amplifier, said first switching transistor providing, when rendered conducting, a low impedance conductive path between said delay stage input terminal and said input electrode of said first transistor amplifier for altering the charge on said storage capacitance to establish a voltage level thereat substantially corresponding to the signal level at said delay stage input terminal at the time of conduction of said first switching transistor;

e. a second MOS transistor amplifier having substantially unity gain and having an input electrode at which storage capacitance is exhibited, a common electrode and an output electrode;

f. a second MOS switching transistor having gate, source and drain electrodes, the source-drain path of said second MOS switching transistor being disposed serially between the output electrode of said first MOS transistor amplifier and the input electrode of said second MOS transistor amplifier, said second switching transistor providing, when rendered conducting, a low impedance conductive path between said output electrode of said first transistor amplifier and the input electrode of said second transistor amplifier for altering the charge on said last-named storage capacitance to establish a voltage level thereat substantially corresponding to the signal level at said output electrode of said first transistor amplifier at the time of conduction of said second switching transistor;

g. means coupling said output electrode of said second MOS transistor amplifier to said delay stage output terminal; and h. a common switching waveform path connected to both of said gate electrodes, said first and second switching transistors being of opposite channel conductivity type.

8. Apparatus in accordance with claim 7 wherein each of said transistor amplifiers includes, as a load impedance disposed on said common substrate, an MOS transistor having a source electrode connected to the respective amplifier output electrode, and gate and drain electrodes directly connected to each other.

9. An integrated circuit analog signal delay line comprising, in combination on a common substrate,:

a plurality of delay stages in cascade, each of said delay stages including:

a. a delay stage input terminal;

b. a delay stage output terminal;

c. a first MOS transistor amplifier having substantially unity gain and having an input electrode at which storage capacitance is exhibited, a common electrode and an output electrode;

d. a first MOS switching transistor having gate, source and drain electrodes, the source-drain path of said first MOS switching transistor being disposed serially between said delay stage input terminal and said input electrode of said first MOS transistor amplifier, said first switching transistor providing, when rendered conducting, a low impedance conductive path between said delay stage input terminal and said input electrode of said first transistor amplifier for altering the charge on said storage capacitance to establish a voltage level thereat substantially corresponding to the signal level at said delay stage input terminal at the time of conduction of said first switching transistor;

e. a second MOS transistor amplifier having substantially unity gain and having an input electrode at which storage capacitance is exhibited, a common electrode and an output electrode;

f. a second MOS switching transistor having gate, source and drain electrodes, the source-drain path of said second MOS switching transistor being disposed serially between the output electrode of said first MOS transistor amplifier and the input electrode of said second MOS transistor amplifier, said second switching transistor providing, when rendered conducting, a low impedance conductive path between said output electrode of said first transistor amplifier and the input electrode of said second transistor amplifier for altering the charge on said last-named storage capacitance to establish a voltage level thereat substantially corresponding to the signal level at said output electrode of said first transistor amplifier at the time of conduction of said second switching transistor;

g. means coupling said output electrode of said second MOS transistor amplifier to said delay stage output terminal; and h. means, including mutually exclusive switching waveform paths connected to each of said gate electrodes, for alternately rendering conducting said first and second switching transistors so that a signal level appears at said delay stage output terminal at a time of conduction of said second switching transistor substantially corresponding in level to the signal level appearing at said delay stage input terminal during the immediately preceding time of conduction of said first switching transistor, and such signal level appearance at said delay stage output terminal persists during the immediately succeeding time of conduction of said first switching transistor.

10. Apparatus in accordance with claim 9 wherein each of said transistor amplifiers includes (1) an MOS amplifier transistor having a gate electrode serving as said amplifier input electrode, a source electrode serving as said amplifier common electrode and a drain electrode serving as said amplifier output electrode, in association with (2) an MOS load transistor, substantially equal in geometrical size to said MOS amplifier transistor, having a source electrode connected to the associated amplifier transistor drain electrode, and conductively joined gate and drain electrodes, and wherein said MOS amplifier transistors and said MOS load transistors are of the same channel conductivity type as said MOS switching transistors.

* * * * *